Dec. 30, 1952     G. G. ORNSTEIN     2,623,427
SCREW THREAD FASTENER WITH FLEXIBLE OPERATOR
Filed April 25, 1949
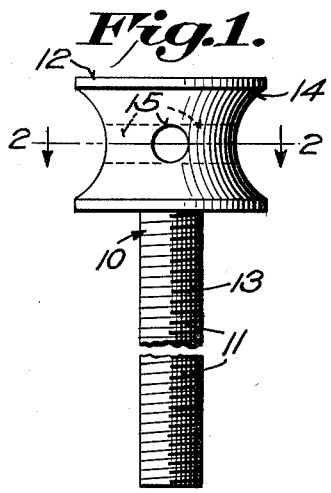
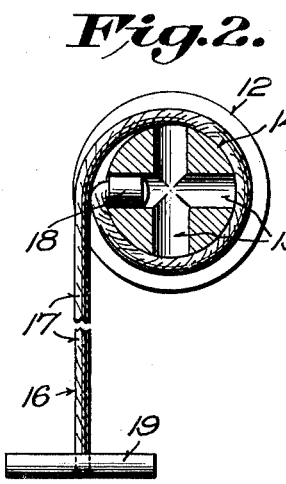
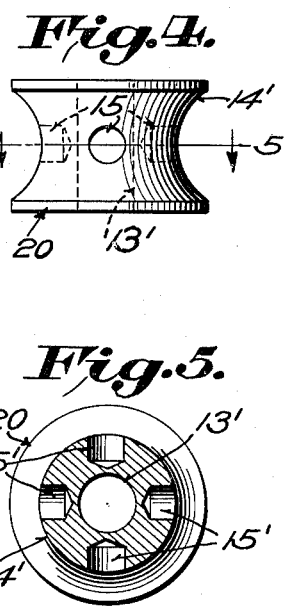
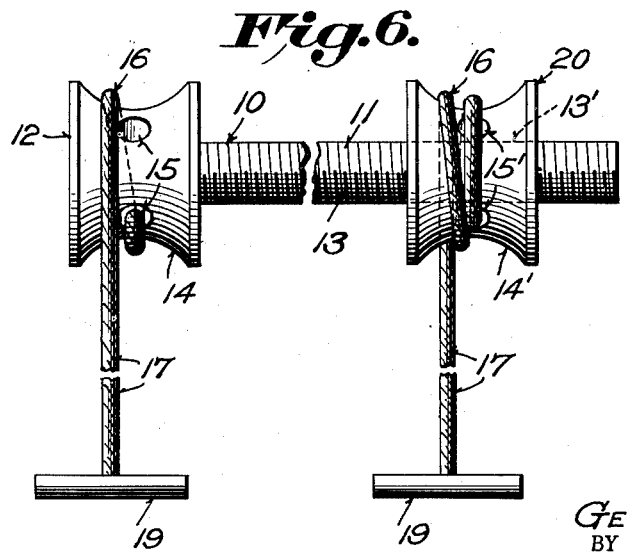
INVENTOR.
GEORGE ORNSTEIN,
BY
Stowell & Evans
ATTORNEYS Patented Dec. 30, 1952

2,623,427

UNITED STATES PATENT OFFICE 2,623,427

SCREW THREAD FASTENER WITH FLEXIBLE OPERATOR

George Guttman Ornstein, New York, N. Y.

Application April 25, 1949, Serial No. 89,451

1 Claim. (Cl. 81—64)

This invention relates to a fastening device of the screw thread type requiring a rotating or spinning moment for engagement or disengagement.

It is an object of the invention to provide a screw threaded fastener that can be used in situations where there is insufficient room for the use of standard lugs, bolts, or nuts requiring conventional operating wrenches or screwdrivers.

A further object of the invention is to provide a fastening device of the screw thread type that may be rotated at any convenient distance or angle from the fastener.

Another object of the invention is to provide such a device that may be rapidly released or engaged and is readily adaptable for use upon emergency equipment where rapidity of operation is an essential.

These and other objects and advantages are provided by a fastener of the screw thread type which, in its preferred embodiment, includes a threaded member provided with a perimetric groove in a plane normal to the axis of the screw thread, at least one radial socket in the groove, an elongated flexible member adapted to be wound in the groove and having a lug secured to one end thereof for insertion in the socket for imparting rotary motion to the threaded member when the flexible member is pulled.

The invention will be more particularly described with reference to the illustrative embodiments of the invention shown in the accompanying drawing in which:

Fig. 1 is a plan view of a screw threaded bolt embodying the principles of the invention, Fig. 2 is a section on line 2—2 of Fig. 1 showing the operating tool encircling the threaded member, Fig. 3 is a plan view of the operating tool of the invention, Fig. 4 is an end view of another form of the invention as embodied in a nut;

Fig. 5 is a sectional view of the screw threaded nut on line 5—5 of Figure 4 and, Fig. 6 is a plan view of the operating tools attached to still another form of the invention.

With reference to the drawings and in particular to Figs. 1, 2, and 3, 10 is a screw threaded bolt having a threaded shank 11 and head 12. Encircling head 12 at right angles to the axis of bolt threads 13 is a perimetric groove 14 having radial lug engaging sockets 15 disposed therein.

Sockets 15 may extend through the entire diameter of head 12 as shown in Fig. 2 of the drawings or they may terminate at a fixed distance within the head, depending upon the type and size of the particular fastener.

The fastening device operating tool 16 as shown in Figs. 2, 3, and 6, comprises an elongated flexible member 17 which may be a cord, cable, or chain, and constructed of any suitable material that will be flexible while possessing relatively non-elastic properties.

A lug 18 is attached to one end of the flexible cable 17 for anchoring the cable in one of the sockets of the threaded fastener to prevent the cable from slipping when it is pulled to rotate the fastener as more fully described hereinafter.

In the illustrated form of the invention a bar-like hand grip 19 is attached to the other end of flexible cable 17. It will be evident that other forms of handles could be used such as loops or rings and that they may be attached to the cable by any well known means, for example, by welding or by passing the cable through a hole drilled in the hand grip 19 and knotting the cable on the other side.

In Figs. 4 and 5 another form of the device of the invention is shown comprising an internally threaded element 20 provided with a perimetric groove 14' in a plane normal to the axis of the screw threads 13' for receiving convolutions of the flexible tool 16. Within retaining groove 14' are radial sockets 15' for receiving the lug 18 of tool 16.

In the forms of the invention illustrated four lug engaging sockets, at right angles to each other, are shown but a greater or lesser number of sockets may be provided in the fastening device when required on particular installations.

To operate the screw threaded fastener of the invention whether the fastener is in the form of a lug bolt, nut, or bolt and nut combination, lug 18 of the flexible operating tool is inserted in the most convenient socket. Next the loose end of the cable 17 is wrapped about the threaded member within its cable retaining groove as shown in Figs. 2 and 6. The direction of the convolutions of the cable will depend upon whether the screw threads are left or right handed, and whether the fastener is to be engaged or disengaged. After sufficient windings have been made the operator pulls upon the loose end of the operating tool by gripping its handle 19, thus unwinding the convoluted cable and rotating the fastening device. This operation may be repeated if the cable is short until the fastener is fully engaged or disengaged.

When the fastener device is in the form illustrated in Fig. 6 of the drawings, a pair of flexible tools may be used. One is wrapped about the bolt and the other about the threaded nut whereby both elements may be rotated simultaneously or independently.

It will be evident that various modifications may be made in the construction and operation of the fastening device and in the form of the means for rotating it. For example, a standard bolt or nut may be employed in cooperation with a fastener constructed in accordance with the principles of the invention where only a part of the screw threaded fastener is in such a position that it is inaccessible to a standard wrench or screw-driver.

From the foregoing description it will be seen that the present invention provides a screw threaded fastening device whereby the aims, objects and advantages of the invention are fully accomplished.

I claim:

A fastener of the screw thread type comprising a threaded member provided with a perimetric groove in a plane normal to the axis of the screw thread, at least one radial socket in said groove, an elongated flexible member having a lug secured to one end thereof for insertion in said socket the remaining portion of the elongated flexible member being coiled in said groove whereby rotary motion is imparted to the threaded member when the free end of the flexible member is pulled thereby releasing the lug from said socket.

GEORGE GUTTMAN ORNSTEIN.

REFERENCES CITED

The following references are of record in the file of this patent:

UNITED STATES PATENTS

| Number | Name | Date |
|---|---|---|
| 181,990 | Smith | Sept. 5, 1876 |
| 375,206 | Shelton | Dec. 20, 1887 |
| 678,805 | Weyand | July 16, 1901 |
| 1,528,691 | Price et al. | Mar. 3, 1925 |
| 2,187,399 | Hopkins | Jan. 16, 1940 |